Feb. 6, 1962     H. B. RANDOLPH     3,019,526
MEMBERS HAVING A METAL PART SECURED TO A WOODEN PART
Filed Jan. 20, 1960
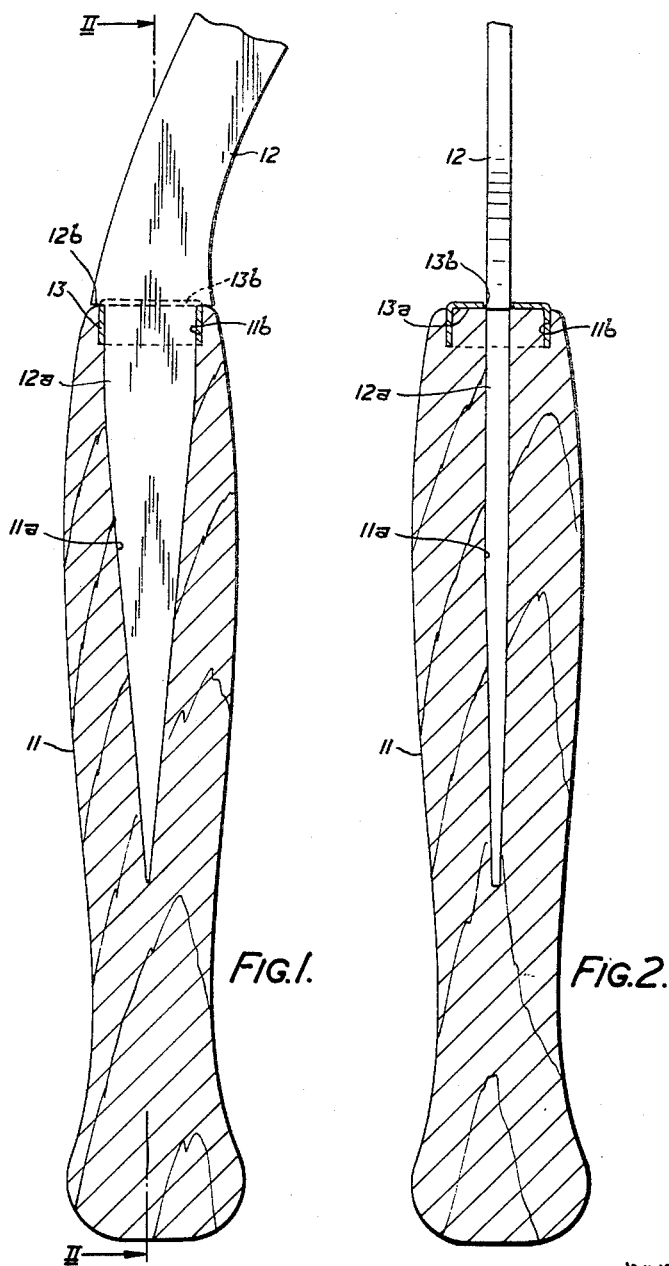
INVENTOR
Harry Beckham Randolph
BY
Mason, Mason & Albright
ATTORNEYS United States Patent Office 3,019,526
Patented Feb. 6, 1962

3,019,526
MEMBERS HAVING A METAL PART SECURED TO A WOODEN PART
Harry Beckham Randolph, 16 Pall Mall, London, England
Filed Jan. 20, 1960, Ser. No. 3,521
4 Claims. (Cl. 30—341)

This invention relates to members having a metal part secured to a wooden part, and a method of securing said parts together.

One example of the class of members to which the present invention relates is garden tools. Thus, in the case of hedge cutting shears, it is common for the shear blades to be connected to wooden handles by metal tangs which each fit within an aperture in the wooden handle.

The present invention provides a member having an elongated part extending into and secured to a wooden part wherein a ferrule extending around said elongated part is fitted into an annular slot within the wooden part.

The present invention further provides a member having an elongated part which extends into an elongated hole formed in a wooden part, said wooden part being formed with an annular slot surrounding the elongated hole, into which annular slot a ferrule is fitted, said ferrule having a base which covers the surface area of the wooden part defined within said annular slot.

Again, the present invention provides a member having an elongated part which extends into a wooden part in a direction substantially normal to a surface thereof, wherein a cup-shaped ferrule, having a slit in the base thereof through which said elongated part extends in a close fit, is fitted into an annular recess extending into said wooden part substantially normal to said surface.

Again, the present invention provides the method of securing an elongated part to a wooden part which includes the steps of cutting an annular slot in the wooden part to receive a ferrule, fitting a ferrule in said slot, cutting through the wooden part enclosed by said ferrule to form the hole for receiving the elongated part, and securing said part in the hole.

One embodiment of the invention, applied to a handle of garden shears, will now be particularly described by way of example only, with reference to the accompanying drawings in which:

FIGURE 1 is a cross-section through a handle of garden shears.

FIGURE 2 is a cross-section on the line II—II of FIGURE 1.

In this construction of shears, each of two wooden handles 11 has a central hole 11a of rectangular cross-section extending inwardly from one end of the handle normal to said end, and a tang 12 has a portion 12a of reduced width which fits within this hole.

According to the invention and with a view to providing a more secure fit of the tang to the wooden handle, a metal ferrule 13 is provided for each handle. This ferrule is of cup-shape with a flat circular base 13a which is provided with a diametrical slot 13b of a width corresponding to the thickness of the tang.

An annular hole or slot 11b is shell cut in the end of each handle of a sufficient depth to accommodate the ferrule, the diameter being such that the ferrule must be inserted in the hole under pressure. The flat base of the ferrule is uppermost and stands slightly proud of the mouth of the hole 11b in the handle. Prior to the insertion of the tang, the rectangular hole within the handle may be coated with an adhesive. With the tang on which the handle is to be fitted heated, the handle is then driven home on to the tang until a shoulder or step 12b, formed by a change in the width of the tang, enters the diametrical slot in the ferrule and abuts against the mouth of the hole in the handle and the rim of the ferrule at each end of he slot. The heat in the tang serves to warm the adhesive.

When thus fitted, the ferrule not only binds the wood but holds the pressure of the tang against the wood to ensure a secure fit between the tang and the handle. Furthermore, the ferrule prevents moisture entering the hole in the handle and affecting the fit between the tang and the handle.

It will be apparent that ferrules may be used in a similar way for other members in which a metal part is secured to a wooden part.

The method of fitting the ferrule in the mouth of the handle by forming a circular hole by shell cutting ensures a secure fit of the ferrule to prevent splitting of the wooden handle. Preferably this operation is performed before the deep hole 11a is cut along the axis of the handle for receiving the tang portion 12a. This greatly reduces the risk of the handle splitting when the hole 11a is cut.

In a modified form of ferrule (not shown), the slot in the base of the ferrule may extend across less than the full diametrical width of the base.

In a further modified form of ferrule (not shown), the ferrule is formed in two parts, namely an open-ended cylindrical portion and a slotted cover, for example in the form of a disc or washer.

I claim:

1. Garden shears comprising a pair of pivoted blade and wooden handle members, a tang integral with each said blade, said tang being of rectangular cross-section and tapering along its length, each handle member having an annular slot extending therealong from one end thereof, said slot being spaced from the periphery of the handle to define externally thereof an annular wooden sheath and internally thereof a wooden core, said core having a hole therein of elongate rectangular cross-section and dimensioned to receive said tang in a tight fit, said hole extending along the length of said rectangular cross-section into close proximity with said slot, said hole extending longitudinally of the handle beyond said slot, a ferrule comprising a cylindrical portion and a base portion integral and laterally coextensive therewith, said cylindrical portion fitting tightly within said slot and embracing said core, the base portion abutting the end of the handle and having a parallel sided slot extending fully across said base portion, said tang fitting tightly within said hole, and shoulders formed on opposite sides of said tang abutting against the end surface of the handle and the cylindrical portion of said ferrule.

2. Garden shears comprising a pair of blade and handle members, means pivotally interconnecting said members, a tang of elongated rectangular cross-section integral with each said blade extending into a correspondingly dimensioned hole preformed along the axis of the associated handle, said handle having an annular slot extending around said tang spaced from the outer periphery of the handle and defining therewithin a wooden core substantially bisected by said hole, a ferrule comprising a cylindrical sleeve portion and a base portion integral therewith, the area of said base portion being substantially identical with the cross-sectional area of the cylindrical portion, said cylindrical portion fitting tightly into said slot and said base portion abutting the end of the handle, said base portion having a rectangular elongated slot extending diametrically wholly across said base portion, and shoulders formed on opposite sides of said tang which extend through said slot and abut said cylindrical portion.

3. Garden shears comprising a pair of blade and handle members, means pivotally interconnecting said members, a tang of elongated rectangular cross-section integral with each said blade extending within a preformed hole along the axis of the associated handle, said handle having an annular slot extending around said tang the internal diameter of the slot being substantially equal to the width of said tang, said slot being spaced from the outer periphery of the handle, a cup-shaped ferrule comprising a cylindrical portion and a base portion integral therewith, said base portion having an overall diameter equal to the external diameter of the cylindrical portion, said cylindrical portion fitting tightly into said slot and said base portion having an internal surface in abutment with the end of the handle, said base portion having a rectangular elongated slot whose length is equal to the external diameter of the cylindrical portion, outwardly stepped portions being provided on opposite sides of said tang which fit within said slot, said outwardly stepped portions having surfaces which are coplanar with said internal surface of the base portion and abut said cylindrical portion.

4. Garden shears comprising a pair of blade and handle members, means pivotally interconnecting said members, a tang of elongated rectangular cross-section integral with each said blade extending along a preformed hole on the axis of the associated handle, said handle having an annular slot extending around said tang and spaced from the outer periphery of the handle, a cup-shaped ferrule comprising a cylindrical portion whose internal diameter is substantially equal to the width of the tang, and a base portion integral therewith, said base portion having an overall diameter equal to the external diameter of the cylindrical portion, said cylindrical portion fitting tightly into said slot and said base portion having an internal surface in abutment with the end of the handle, and an external surface spaced from the end of the handle, said base portion having a parallel-sided slot extending diametrically across the full width of the base portion dividing said base portion into two separate equal parts, said tang having extensions in the vicinity of the slot which protrude laterally of the handle from the ends of said slot and terminate adjacent the outer periphery of the handle.

References Cited in the file of this patent
UNITED STATES PATENTS

| | | |
|---|---|---|
| 431,959 | Young | July 8, 1890 |
| 1,254,591 | Hachmann | Jan. 22, 1918 |
| 2,023,269 | Edgren et al. | Dec. 3, 1935 |
| 2,272,805 | Jaasund et al. | Feb. 10, 1942 |

FOREIGN PATENTS

| | | |
|---|---|---|
| 111,516 | Australia | Sept. 11, 1940 |
| 279,402 | Switzerland | Mar. 1, 1952 |
| 391,894 | Germany | Sept. 7, 1925 |
| 448,676 | Great Britain | June 12, 1936 |